United States Patent
Ebert et al.

[11] Patent Number: 5,314,147
[45] Date of Patent: May 24, 1994

[54] HELICOPTER ENGINE SPEED ENHANCEMENT DURING HEAVY ROTOR LOAD AND RAPID DESCENT RATE MANEUVERING

[75] Inventors: Frederick J. Ebert, Westport; Robert W. Rice, Sandy Hook, both of Conn.

[73] Assignee: United Technologies Corporation, Hartford, Conn.

[21] Appl. No.: 750,846

[22] Filed: Aug. 27, 1991

[51] Int. Cl.⁵ .................. B64C 11/44; G05D 1/00
[52] U.S. Cl. .................. 244/182; 244/17.13; 244/195; 364/431.07
[58] Field of Search ............ 244/17.13, 182, 191, 244/194, 195, 180, 181; 364/431.05, 431.07, 433, 434

[56] References Cited

U.S. PATENT DOCUMENTS

| | | | |
|---|---|---|---|
| 4,488,235 | 12/1984 | Miller | 364/434 |
| 4,807,129 | 2/1989 | Perks | 244/17.13 |
| 4,947,334 | 8/1990 | Massey et al. | 244/17.13 |
| 4,980,684 | 12/1990 | Patterson et al. | 244/17.13 |
| 4,998,202 | 3/1991 | Walsh et al. | 364/431.020 |
| 5,001,646 | 3/1991 | Caldwell | 364/424.01 |
| 5,079,711 | 1/1992 | Lambregts et al. | 364/434 |

FOREIGN PATENT DOCUMENTS 2248453  6/1993  Fed. Rep. of Germany ... 244/17.13
2144244  11/1986  United Kingdom .

Primary Examiner—Michael S. Huppert
Assistant Examiner—Virna Lissi Ansley
Attorney, Agent, or Firm—Michael Grillo

[57] ABSTRACT

A helicopter engine speed reference (66) is increased (117,118) in response to heavy rotor loading (102) in excess of a threshold at the current descent rate (FIG. 4). The reference speed is faded up (117,118) at a rapid rate to 107% of rated speed (119). After a fixed time interval (129), reduce rotor loading (122), reduced pitch angle below a threshold magnitude (121) and reduced roll angle below a threshold magnitude (120) will cause the reference speed to be faded down slowly (146,147) to rated speed (148). Automatic increase in engine reference speed is overridden to 107% of rated speed (203) when a battle switch is activated (201) and weapons are ready (202). Increases in engine reference speed are prohibited (207) when the helicopter is operating in quiet mode (206) or the helicopter is resting on its wheels (208).

7 Claims, 5 Drawing Sheets

HELICOPTER ENGINE SPEED ENHANCEMENT DURING HEAVY ROTOR LOAD AND RAPID DESCENT RATE MANEUVERING

The Government has rights in this invention pursuant to Contract No. DAAJ09-89-C-A002 awarded by the Department of the Army.

TECHNICAL FIELD

This invention relates to helicopter fuel controls, and more particularly to providing enhanced engine speed during heavy rotor load and rapid descent rate maneuvers.

BACKGROUND OF THE INVENTION

In United Kingdom Patent No. 2,144,244 B to Cooper and Howlett, positive longitudinal pitch rate is used to indicate high rotor load factors, such as during high speed highly banked turns. The pitch rate signal is shaped, and when air speed exceeds a threshold level, the shaped signal is added to the normal engine reference speed signal, such as to command a higher engine speed. Said patent also suggests that a signal derived by shaping the output of a vertical body axis accelerometer could be used to enhance engine speed during heavy rotor load maneuvers, either alone or in conjunction with the shaped pitch rate signal. The enhanced engine speed increases the lift capacity and, consequently, the stall margin of the rotor during high rotor load maneuvers.

It was found that using a shaped pitch rate signal tends to abruptly reduce the engine speed near the end of a high rotor load maneuver, inducing yaw transients which are highly undesirable at precisely the point where stability is desired, thereby adding significantly to pilot workload. Further, using such a shaped signal tends to cause the engine to achieve speeds in excess of reference speed under heavy load, thus causing a tendency towards exceeding maximum permissible torque in the engine. Therefore, the pilot is required to constantly monitor engine torque, and provide either load-relaxing inputs to the blade pitch controls or lower engine speed using the pilot's engine speed beeper during the maneuver to prevent exceeding maximum permissible torque in the engine. As used herein, the terms "beep", "beep-up", and "beep-down" are intended to refer to pilot initiated variation in the engine reference speed from 100% rated speed using the aforementioned manually operated pilot's engine speed beeper.

In response to the aforementioned problems, U.S. Pat. No. 4,998,202 to Walsh et al. provides an improved fuel control which monitors vertical acceleration as determined from a vertical body axis accelerometer, and in response to a high load factor, i.e., a high vertical acceleration, in excess of a threshold level, a bias signal is provided so that helicopter engine reference speed is rapidly faded up to a maximum engine speed. Thereafter, the increased engine speed is maintained for a fixed period to ensure that maneuvers can be completed before the engine is allowed to droop. At the completion of the fixed period, load factor status is again checked for exceeding a lower acceleration threshold. If the load factor is below the lower threshold, the bias signal is progressively decreased to effect a gradual reduction in rotor speed from the enhanced rotor speed. Further, to prevent an engine over-torque condition, the bias signal is nulled if the engine torque exceeds a maximum threshold level. The increase in engine reference speed above 100% reference speed during heavy rotor loading is known as "load factor enhancement" or "engine speed enhancement", which terms are used interchangeably hereinafter.

The load factor enhancement described in the '202 patent to Walsh et al. dramatically improves yaw and aircraft altitude stability following high acceleration maneuvers. Accordingly, the targeting capability, i.e., the ability to lock onto a target, is greatly improved following such maneuvers. However, such load factor enhancement has been found to be inadequate for certain maneuvers. For example, prior to performing a "gun run", i.e. a generally nose down or high pitch angle descent lasting on the order of ten to fifteen seconds until pull-up at the completion of the run, the pilot will typically perform an observation type run or fly over which is followed by a roll-out maneuver producing sufficient vertical acceleration to initiate load factor enhancement. Thereafter, during the gun-run descent, the load factor enhancement may terminate prior to the end of the maneuver, and not be activated for the pull-up at the completion of the run.

Similarly, a bob-up maneuver involves a situation wherein the aircraft is initially hovering nap of the earth, i.e., below tree tops or behind mountains to remain covert, and then rapidly ascends above the tree top to perform observation. During the bob-up maneuver, sufficient vertical acceleration may or may not be produced to initiate load factor enhancement. At the completion of the observation, a bob-down maneuver is performed to return to the nap of the earth. Depending on the severity of the bob-down maneuver, i.e., the rate of descent, the rotor will tend to droop, and if the load factor enhancement has terminated prior to completion of the bob-down maneuver, or if load factor enhancement was never initiated during the bob-up maneuver, the pilot is left in the precarious position of performing the maneuver with less than maximum power.

DISCLOSURE OF THE INVENTION

Objects of the invention include engine speed enhancement, during heavy rotor load and rapid descent rate maneuvering of a helicopter, which remains active in response to pitch angle, roll angle or rotor load remaining above respective threshold levels, and which may be overridden to maintain engine speed enhancement under battle conditions and to prevent engine speed enhancement during quiet operations.

According to the invention, helicopter rotor loading and helicopter descent rate are monitored, the occurrence of helicopter rotor loading in excess of a threshold magnitude for a given descent rate induces a fade-up of engine set speed above rated speed, then when instantaneous roll angle is less than a roll angle threshold magnitude, instantaneous pitch angle is less than a pitch angle threshold magnitude, and load factor is reduced below a threshold magnitude, the engine reference speed is faded down to rated speed.

In further accord with the present invention, once fade-up of engine reference speed has commenced, the increased reference speed will be maintained for a fixed period to allow completion of maneuvers before determining whether reduced roll angle, pitch angle and load factor should cause commencement of fade-down of the reference speed.

In still further accord with the present invention, in response to heavy rotor loading above a threshold magnitude for a given descent rate, the engine reference speed is faded up at a first rate to achieve a desired speed in excess of rated speed, and in response to reduced roll angle, pitch angle and rotor loading after a fixed period, engine speed is faded down at a much slower second rate than faded up, so as to return to rated speed over a longer period.

According to a further aspect of the present invention, automatic fade-up and fade-down of engine reference speed is overridden to maintain engine reference speed increased in response to activation of a battle switch when weapons are hot, and to prevent the increase of engine reference speed during operation in quiet mode or when the helicopter is resting on the ground.

The present invention provides improved heavy rotor load maneuvering, with low pilot workload, and significantly reduced yaw transients in the final phases of maneuvering. Additionally, the present invention prevents the premature termination of engine speed enhancement during high roll angle and high pitch angle maneuvers, thereby providing additional power at the completion of such maneuvers. Another important aspect of the present invention is that the threshold level of vertical acceleration for commencement of engine speed enhancement is dependent upon both vertical acceleration and descent rate, and requires a lower vertical acceleration during high descent rate maneuvers for initiation of engine speed enhancement. Therefore, at the completion of a rapid descent rate maneuver, additional power is available to stabilize the aircraft.

The invention further provides for overriding automatic engine speed enhancement under certain operational conditions. For example, under battle conditions, where the need for enhanced fighting capability may outweigh the need for fuel economy, engine reference speed may be overridden to provide continuous operation at an increased engine reference speed. Similarly, during operation in a quiet mode, i.e., where engine reference speed is reduced to lower noise produced, automatic engine reference speed enhancement is overridden to prevent undesirable increases in the noise produced during quiet operations.

The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

The fuel control of the present invention is of a type described in commonly owned U.S. Pat. No. 4,988,202 to Walsh et al., the disclosure of which is incorporated herein by reference. The fuel control of the present invention is particularly well suited for providing engine speed enhancement during heavy rotor load and rapid descent rate maneuvers, which speed enhancement remains active in response to roll angle, pitch angle or rotor load remaining above respective threshold levels.

Figure 1:
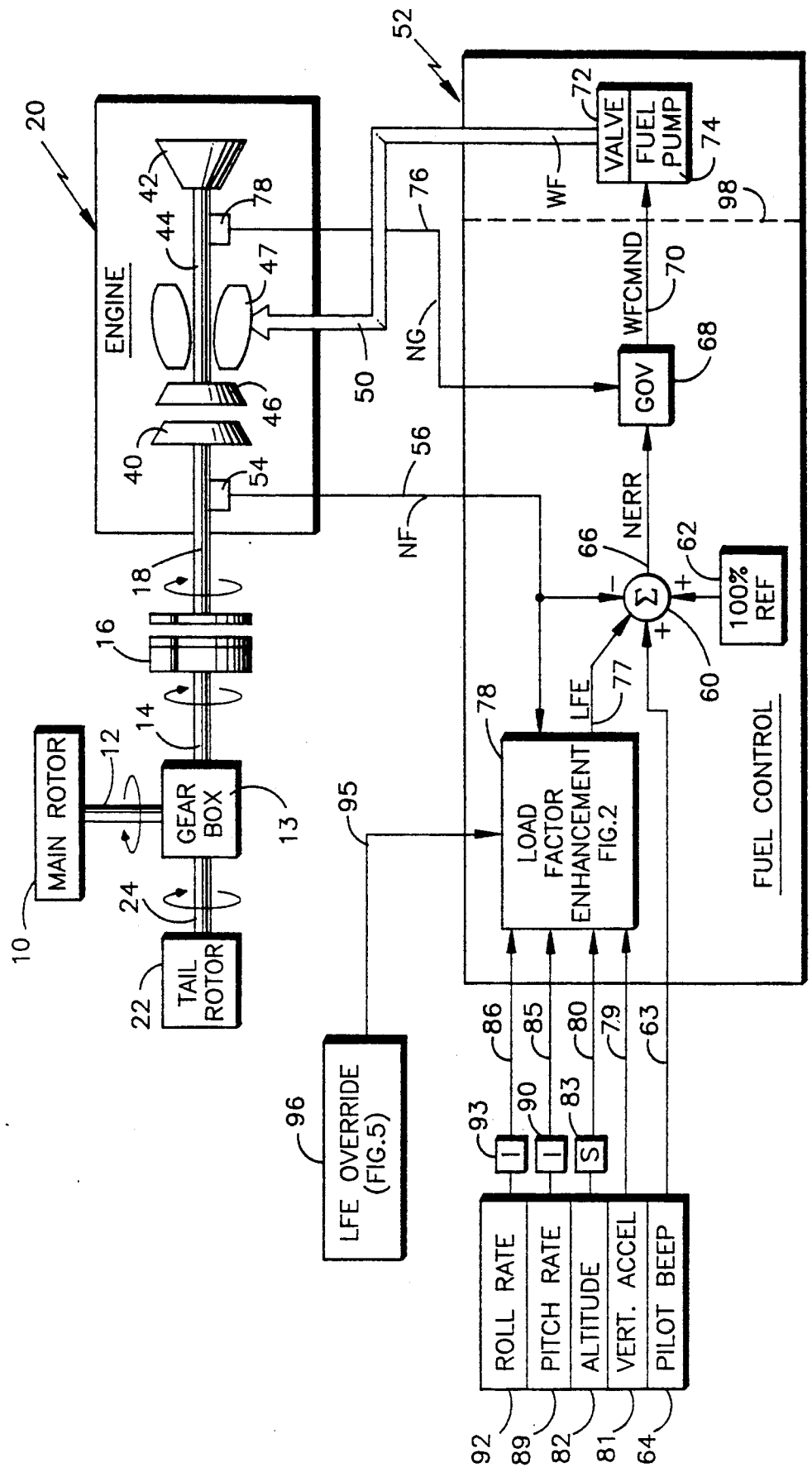
FIG. 1 is a simplified schematic diagram of a helicopter drive system and engine fuel control, incorporating precepts of the present invention.

Referring now to FIG. 1, a main rotor 10 is connected through a shaft 12 to a gearbox 13 which is driven by a shaft 14 through an overrunning clutch 16, which engages an output shaft 18 of an engine 20 when the engine speed equals or exceeds the rotor speed. The gearbox 13 also drives a tail rotor 22 through a shaft 24 so that the main rotor 10 and the tail rotor 22 are always driven at speeds bearing a fixed relationship to each other, such as the tail rotor rotating about 5 times faster than the main rotor.

The engine 20 may typically comprise a free turbine gas engine in which the output shaft 18 is driven by a free turbine 40, which is in turn driven by gases from a gas generator including a turbocompressor having a compressor 42 connected by a shaft 44 to a compressor-driving turbine 46, and a burner section 47 to which fuel is applied by fuel lines 50 from a fuel control 52.

The fuel control 52 typically tries to provide the correct rate of fuel (WF) in the fuel inlet lines 50 so as to maintain a desired engine speed (NF) as determined by a tachometer 54 which measures the speed of the free turbine 40, such as on the output shaft 18, to provide a turbine speed indicating signal on a line 56 to a summing junction 60. The other inputs to the summing junction 60 comprise reference speed, which typically is a reference value indicative of 100% rated speed derived from a source 62, together with any pilot desired variant therein provided on a line 63 as determined by a signal from a pilot's engine speed beeper 64. The output of the summing junction 60 is a speed error signal (NERR) on a line 66 which is applied to a governor portion 68 of the fuel control, the output of which is a commanded fuel rate (WFCMND) on a line 70. This is applied to a metering valve 72 so as to cause the correct amount of fuel from a fuel pump 74 to be applied to the fuel inlet lines 50, all in the way that is well known in the art. Within the governor 68, a signal indicative of gas generator speed (NG) on a line 76 may be taken from a tachometer 78 responsive to the gas generator spool including the compressor 42, the shaft 44 and the turbine 46.

Everything described thus far is in accordance with the skill of the art and forms no part of the present invention.

In accordance with the invention, the total reference speed from which the free turbine speed NF is subtracted, so as to provide the speed error signal NERR, includes a load factor enhancement signal (LFE) provided on a line 77 by a load factor enhancement portion 78 of the electronic fuel control. The load factor enhancement portion 78 is responsive to signals on lines 79 and 80 respectively indicative of vertical acceleration, as determined from a vertical accelerometer 81, and descent rate, as provided by an altitude sensor 82, e.g., a radar or laser altimeter, applied to a differentiator 83.

Additionally, the load factor enhancement portion 78 is responsive to signals on lines 85 and 86 respectively indicative of pitch angle, as determined from the output of a pitch rate gyro 89 applied to an integrator 90, and roll angle as determined from the output of a roll rate gyro 92 applied to an integrator 93. The load factor enhancement portion 78 is further responsive to an override signal provided on line 95 from an LFE override portion 96 of the electronic fuel control, which LFE override portion is described in greater detail with respect to FIG. 5.

The load factor enhancement portion 78 is deemed to be the software required to perform the load factor enhancement function in accordance with the present invention, in a fuel control in which the calculations are determined digitally, such as all that portion of the fuel control 52 shown to the left of the dotted line 98. The fuel control may be encompassed within a digital automatic flight control system employing a known microprocessor (UPROC) for executing an algorithmic subroutine of FIGS. 2a, 2b, and 2c, as described hereinafter.

Figure 2A:
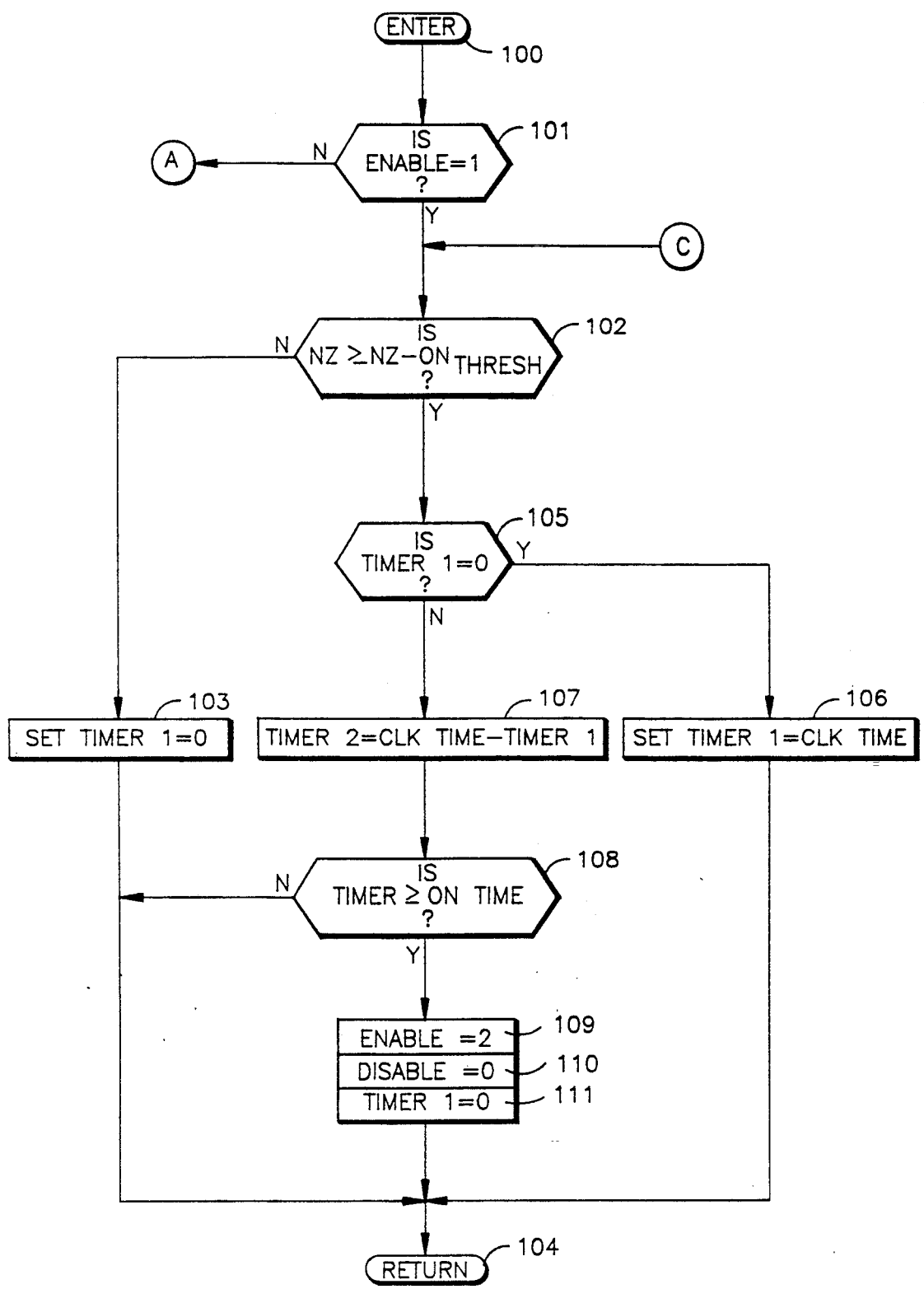
FIGS. 2a, 2b and 2c are a simplified logic flow diagram of a routine for providing engine speed enhancement according to the invention in a digital fuel control.

Referring now to FIG. 2a, a load factor routine is entered in a step 100, and the UPROC performs a first test 101 to determine whether load factor enhancement is enabled. The UPROC contains memory registers, e.g., electronically grouped or segregated data bits, which may contain data indicative of load factor enhancement ENABLE and DISABLE status. The ENABLE memory register (ENABLE) may contain data of three kinds: zero indicating that LFE is equal to its maximum value ($LFE_{MAX}$), e.g., seven percent of rated speed, and therefore, no further engine speed enhancement is available; one indicating that LFE is equal to zero and engine speed enhancement is not currently active; and two indicating that engine speed enhancement is being faded up and LFE is less than $LFE_{MAX}$. Similarly, the DISABLE memory register (DISABLE) may contain data of three kinds: zero indicating that LFE is equal to zero and, therefore, engine speed enhancement is at its minimum value and cannot be further lowered; one indicating that LFE is equal to $LFE_{MAX}$ and fade-down of engine speed enhancement has not yet begun; and two indicating that engine speed enhancement is being faded down and LFE is greater than zero.

Figure 4:
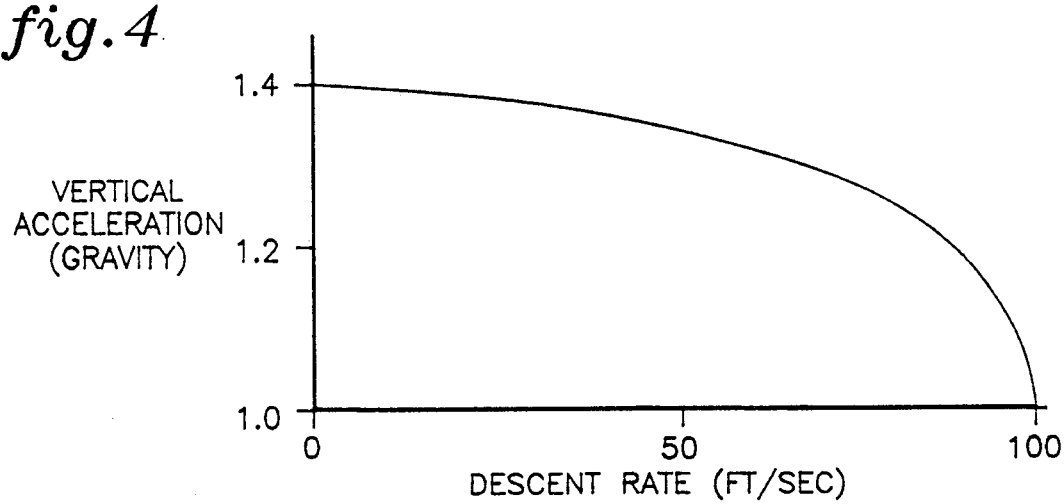
FIG. 4 is an illustration of an exemplary desired relationship between vertical acceleration and vertical descent rate for initiating engine speed enhancement according to the invention.

If the results of the tests 101 are positive, load factor enhancement has not been activated, and the UPROC checks if vertical acceleration (NZ) is greater than or equal to a threshold magnitude for initiation of load factor enhancement ($NZ-ON_{THRESH}$) in a test 102. $NZ-ON_{THRESH}$ is dependent upon vertical descent rate, e.g., for increasing descent rate a lower vertical acceleration is required to initiate load factor enhancement. FIG. 4 is illustrative of an exemplary desired relationship between vertical acceleration and vertical descent rate for initiation of load factor enhancement in accordance with the present invention.

If NZ does not exceed $NZ-ON_{THRESH}$, the results of the tests 102 are negative, and the UPROC performs a step 103 in which a first timer (TIMER 1) is set equal to zero. The subroutine then returns in a step 104. If NZ does exceed $NZ-ON_{THRESH}$, the results of the tests 102 are positive, and the UPROC checks if TIMER 1 is equal to zero in a test 105. Initially, the results of the test 105 are positive, and step 106 is performed wherein TIMER 1 is set equal to the instantaneous time of the UPROC internal clock (CLK TIME). The subroutine then returns in the step 104. The subroutine is reentered in the step 100, and if NZ remains above $NZ-ON_{THRESH}$, the subroutine again reaches the test 105, the results of which will be negative, and a step 107 is performed wherein a second timer (TIMER 2) is set equal to CLK TIME less TIMER 1 time. Therefore, TIMER 2 will provide an indication of the length of time that vertical acceleration exceeds the vertical acceleration threshold magnitude for initiation of load factor enhancement.

Next, the UPROC checks if TIMER 2 is greater than a first period (ON TIME), e.g., 0.25 seconds, in a test 108. Prior to initiation of load factor enhancement, NZ must exceeds $NZ-ON_{THRESH}$ for the duration of the first period. The results of the test 108 will initially be negative, and the subroutine returns in the step 104. However, once the results of the test 108 are positive, steps 109, 110, and 111 are consecutively performed wherein ENABLE is set equal to two, DISABLE is set equal to zero, and TIMER 1 is set equal to zero. The subroutine then returns in the step 104. It will be noted that if at any time during the first period NZ falls below $NZ-ON_{THRESH}$, the results of the test 102 will be negative, and TIMER 1 will be reset to zero in the step 103. Thereafter, vertical acceleration must exceed the threshold magnitude for the entire first period to initiate load factor enhancement.

Figure 2B:
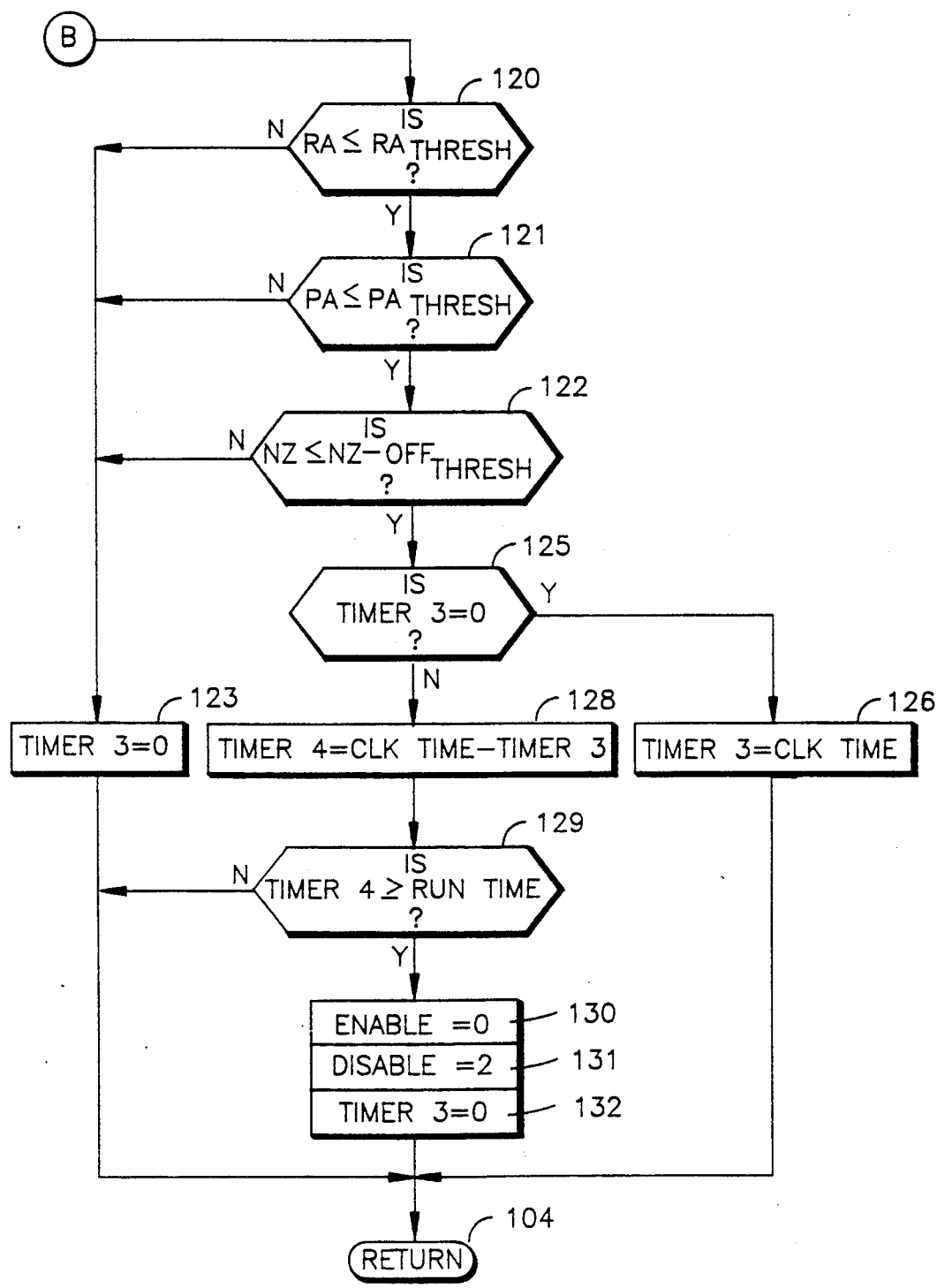
Figure 2C:
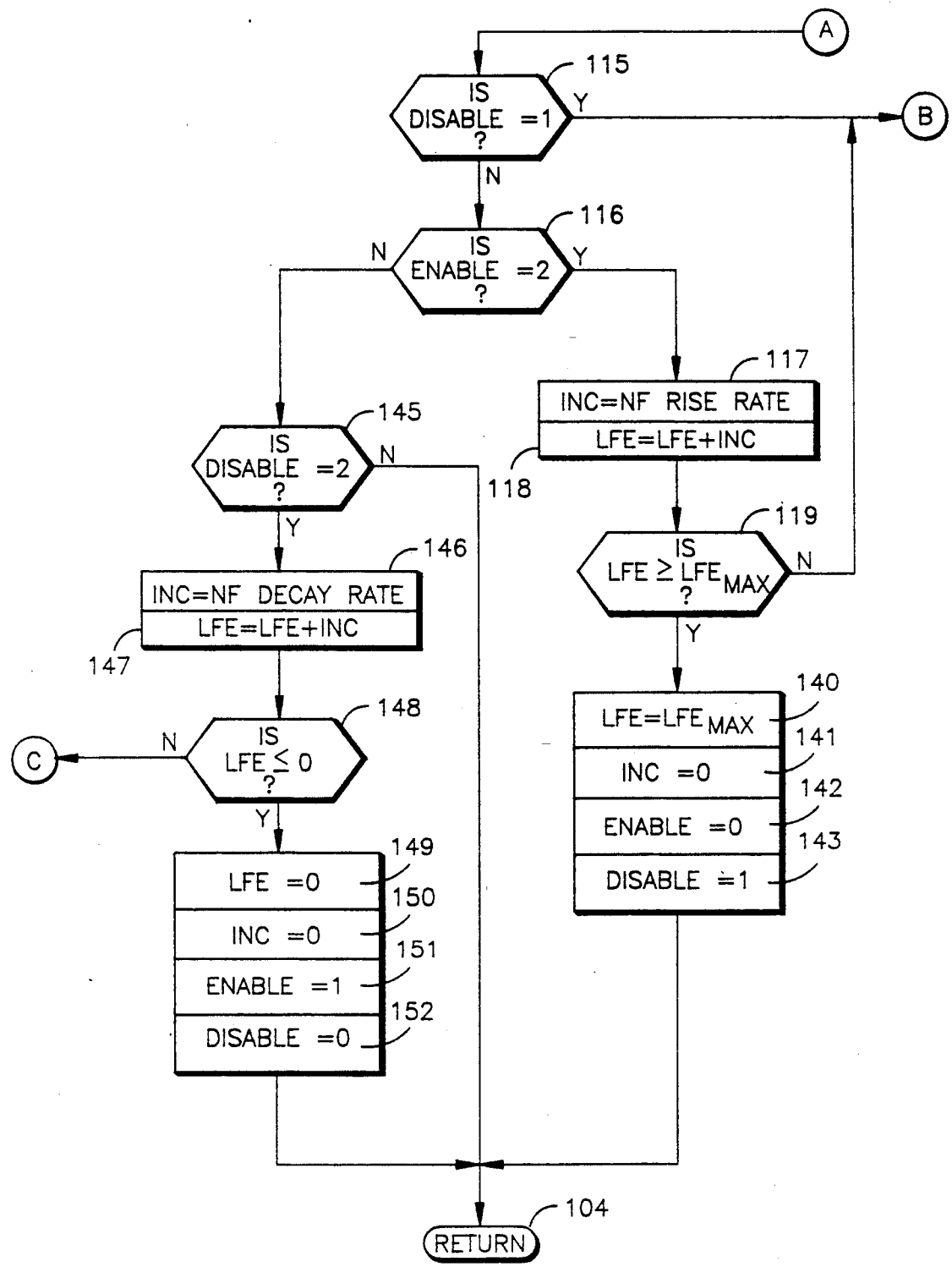
Figure 3:
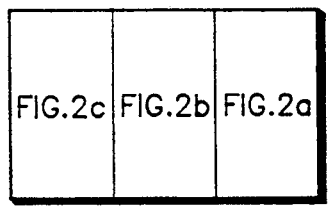
FIG. 3 is an illustration of the relationship between the portions of the logic flow diagram of FIGS. 2a, 2b and 2c.

Referring also to FIGS. 2b and 2c, once vertical acceleration exceeds the threshold acceleration magnitude for the first period, load factor enhancement is enabled in the step 109, and therefore the results of the test 101 are negative. Next, the UPROC checks if DISABLE is equal to one in a test 115. DISABLE was set equal to zero in the step 110, and the negative results of the test 115 reach a test 116 wherein the UPROC checks if ENABLE is equal to two. ENABLE was set equal to two in the test 109, and the positive results of the test 116 reach steps 117 and 118 wherein an LFE increment signal (INC) is set equal to an engine speed fade-up increment (NF RISE RATE), and LFE is set equal to LFE plus INC. The engine speed fade-up increment is selected so that upon successive passes through the subroutine, engine speed is faded up at a desired rate of increase. For example, if the fade-up increment is set at a value of one percent of rated speed, LFE will increase by one percent in each cycle such that, for a machine which iteratively repeats its cycle once every 200 milliseconds, LFE will increased at a rate of five percent per second.

Next, the UPROC checks if LFE has reached $LFE_{MAX}$ in a test 119. Initially, LFE will be less than $LFE_{MAX}$, and the negative results of the test 119 reach a series of tests 120, 121 and 122 which respectively check if instantaneous roll angle (RA) is less than a roll angle threshold magnitude ($RA_{THRESH}$), instantaneous pitch angle (PA) is less than a pitch angle threshold magnitude ($PA_{THRESH}$), and NZ is less than a load factor threshold magnitude for termination of load factor enhancement ($NZ-OFF_{THRESH}$). The conditions checked in the tests 120, 121 and 122 are the conditions which must be met for fade-down of engine speed from its enhanced level. If the results of any one of the test 120, 121 or 122 are negative, engine speed will not be faded down, and a step 123 is performed wherein a third timer (TIMER 3) is set equal to zero. The subroutine then returns in the step 104. However, if the results of all three of the tests 120, 121 and 122 are positive, the conditions for engine speed fade-down are met, and the UPROC checks if TIMER 3 is equal to zero in a test 125.

Initially, the results of the test 125 will be positive and a step 126 is performed wherein TIMER 3 is set equal to CLK TIME. The subroutine then returns in the step 104. Upon subsequent passes through the routine, if the results of the tests 120, 121 and 122 remain positive, the results of the test 125 will be negative, and a step 128 is performed wherein a fourth timer (TIMER 4) is set equal to CLK TIME minus TIMER 3 time. Therefore, TIMER 4 is indicative of the time that all of the conditions of the tests 120 through 122 have been met. Next, the UPROC checks if TIMER 4 is greater than or equal to a second period (RUN TIME), e.g., ten seconds, in a test 129. If the results of the tests 129 are negative, the subroutine returns in the step 104. However, if the results of the test 129 are positive, the steps 130, 131 and 132 are consecutively performed wherein ENABLE is set equal to zero, DISABLE is set equal to two, and TIMER 3 is set equal to zero. The subroutine then returns in the step 104. Therefore, if the conditions for engine speed fade-down checked in the tests 120 through 122 are satisfied, engine speed will not begin to fade-down until after the second period, thereby allowing the pilot to complete maneuvering with the enhanced engine speed. At the end of the second period, the subroutine will begin to fade-down engine speed as described in greater detail hereinafter.

Once LFE is greater than or equal to $LFE_{MAX}$, the results of the test 119 are positive, and the steps 140 through 143 are consecutively performed wherein LFE is set equal to $LFE_{MAX}$, INC is set equal to zero, ENABLE is set equal to zero, and DISABLE is set equal to one. The subroutine then returns in the step 104. Thereafter, the results of the test 101 will be negative and the test 115 will be positive, and the tests 120 through 122 will be performed until the conditions for fade-down are satisfied as described hereinabove.

When the conditions for fade-down have been met, the results of the tests 115 and 116 are negative, and the subroutine reaches a test 145 wherein the UPROC checks if DISABLE is set equal to two. If the results of the test 145 are negative, the subroutine returns in the step 104. However, once all the conditions for fade-down have been satisfied for the duration of the second period, DISABLE is set equal to two in the step 131, and the positive results of the test 145 reach the steps 146 and 147 wherein INC is set equal to the engine speed fade-down increment (NF DECAY RATE), and LFE is set equal to LFE plus INC. Therefore, if the fade-down increment is set at a value equal to a fraction of a percent of rated speed, LFE will decrease by that fraction in each cycle of the subroutine during engine fade-down. The fade-down increment should be selected to be a sufficiently small fraction of a percent of engine speed such that the rate of engine fade-down is not audibly perceptible by the pilot.

Next, the UPROC checks if LFE is less than or equal to zero in a test 148. Initially, LFE will be greater than zero, and the subroutine returns to the test 102 to check if the conditions for commencement of load factor enhancement are again met, e.g., is NZ greater than or equal to $NZ\text{-}ON_{THRESH}$. Thereafter, the subroutine will eventually return in the step 104.

If the conditions for load factor enhancement are not subsequently met, the results of the test 148 will eventually be positive, and the steps 149 through 152 are consecutively performed wherein LFE is set equal to zero, INC is set equal to zero, ENABLE is set equal to one, and DISABLE is set equal to zero. The subroutine returns in the step 104.

An important aspect of the present invention is that the engine fuel control is responsive to both heavy load factor and descent rate for rapidly fading up to a maximum engine speed. The higher the descent rate, the lower the load factor required for engine speed enhancement, as described herein with respect to FIG. 4. Therefore, during a high descent rate maneuver, e.g., a bob-down maneuver, as descent rate increases, lower vertical acceleration is required to initiate load factor enhancement.

Another aspect of the present invention is that engine speed enhancement is maintained for a threshold period which does not start to count down until roll angle, pitch angle and load factor are each below a respective threshold magnitude. Therefore, during a high roll angle or high pitch angle maneuver, e.g., a gun-run, load factor enhancement remains active to ensure that the maneuver can be completed before the engine speed is allowed to droop.

A further aspect of the present invention is that a fade-down rate is selected such that engine speed fade-down is not audibly perceptible to the pilot. This is important so that the pilot will not mistakenly try to compensate for engine speed decreasing to 100% rated speed.

Figure 5:
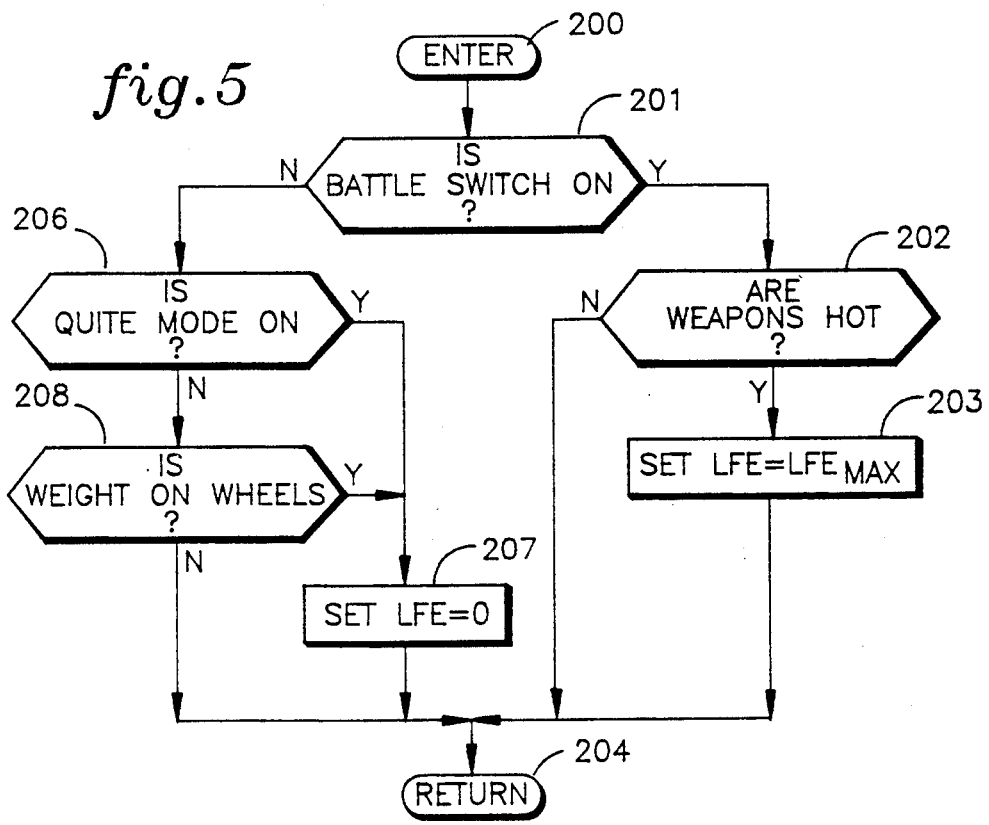
FIG. 5 is a simplified logic flow diagram of a routine for overriding the engine speed enhancement of the invention under certain operating conditions.

Load factor enhancement of the present invention may be overridden under certain operation conditions. Referring to FIG. 5, an LFE override routine is entered in a step 200, and the UPROC performs a first test 201 to determine if a battle switch (not shown) is engaged. If the results of the test 201 are positive, the UPROC checks if the weapons are hot, e.g., made ready for firing, in a test 202. If the results of the test 202 are positive, step 203 is performed wherein LFE is set equal to $LFE_{MAX}$. Therefore, in battle conditions when weapons are ready and the battle switch is engaged, LFE will be overridden to its maximum value to provide the pilot with extra power during engagement with the enemy. The subroutine then returns in a step 204. If the weapons are not made ready, the results of the test 202 are negative, and the subroutine returns in the step 204.

If the results of the test 201 are negative, the UPROC checks if the engine fuel control is operating in a quiet mode, e.g, engine reference speed decreased to a value, typically 90%, so as to reduce noise produced by helicopter operations, in a test 206. If the results of the test 206 are positive, step 207 is performed wherein LFE is set equal to zero. Therefore, load factor enhancement is overridden so that engine speed will not be enhanced during quiet operations. The subroutine then returns in the step 204. If the results of the test 206 are negative, the UPROC checks if there is weight on the helicopter wheels in a test 208. If the results of the test 208 are positive, load factor enhancement is overridden in the step 207, and the subroutine returns in the step 204. However, if the results of both the test 206 and 208 are negative, LFE is not overridden, and the subroutine returns in the step 204.

Although the LFE override routine is illustrated as requiring both the battle switch being activated and the weapons ready to override LFE to its maximum value, the invention will work equally as well if only one of the two conditions must be met to override LFE to its maximum value.

For purposes of the present invention, load factor enhancement mode of operation is described as providing an enhanced engine speed to a maximum value of 107% rated speed; however, this maximum speed is only intended to be exemplary, and may vary depending on the specific design characteristic of a helicopter using load factor enhancement in accordance with the present invention.

The exemplary embodiment herein is described as being implemented within a program of digital fuel control. The particular characteristics of the fuel control are irrelevant, so long as it is of the type that uses a turbine reference speed to control fuel flow to the engine. On the other hand, if a different sort of basic reference were used for the engine of the helicopter, the precepts of the present invention may be readily adapted to accommodate the same. The manner in which the fuel control controls fuel flow is irrelevant to the present invention. The invention is readily implementable in an existing fuel control which has the capacity for the algorithms of the invention and the remaining algorithms of the aforementioned patent.

The invention is described as being performed in a fuel control in which calculations are determined digitally, as for example in a a digital automatic flight control employing a known microprocessor for performing the algorithmic subroutines of the present invention. However, The invention may also be accomplished by dedicated digital hardware or by analog hardware if desired. In such case, it may be implemented in a different fashion from that disclosed herein in accordance with the general equivalence between software as shown herein and dedicated digital hardware and software, all as is well known to those skilled in the art. Additionally, all of the cycle times, counts, and the like herein may of course be adjusted to suit any implementation and utilization of the invention.

Although the invention has been shown and described with respect to exemplary embodiment thereof, it should be understood by those skilled in the art that the foregoing and other changes, omissions and additions may be made therein and thereto, without departing from the spirit and scope of the present invention.

We claim:

1. A control for a helicopter engine having a free turbine for normally driving the helicopter rotors at a rated speed, comprising:
    means for providing an actual speed signal indicative of the rotary speed of the three turbine,
    fuel valve means for metering fuel to said engine at a rate determined by a fuel command signal applied thereto; and
    fuel controlling signal processing means connected for response to said actual speed signal, for providing a reference speed signal indicative of desired rotary speed of the free turbine which reference speed signal normally indicates said rated speed and which reference speed signal alternatively indicates a speed greater than said rated speed in response to high rotor load and high descent rate maneuvers, for providing, in response to said actual speed signal and said reference speed signal, a speed error signal indicative of the difference in turbine speed indicated by said actual speed signal and said reference speed signal, and for providing said fuel command signal to said fuel valve means indicative of a desired fuel flow rate as a function of said speed error signal;

characterized by:
    a vertical accelerometer for providing a vertical acceleration signal indicative of acceleration of the helicopter in a direction substantially parallel to the rotary axis of the main rotor;
    vertical descent rate means for providing a vertical descent rate signal indicative of the vertical descent rate of the helicopter;
    threshold means responsive to said vertical descent rate signal for providing a variable threshold signal, the magnitude of said variable threshold signal being inversely related to the magnitude of said vertical descent rate signal; and
    said fuel controlling signal processing means comprising means responsive to said vertical acceleration signal indicating positive vertical acceleration in excess of said variable threshold signal, for providing successively greater speed increasing increments to said reference speed signal to reach a predetermined reference speed signal indicating a reference speed in excess of rate speed, for providing said predetermined reference speed signal indicating a reference speed in excess of rated speed, for providing said predetermined reference speed signal for at least a predetermined time, and responsive to the lapse of said predetermined time and to said vertical acceleration signal indicating a positive vertical acceleration which is less than a predetermined threshold magnitude for providing successively greater decrements to said reference speed signal to reach a reference speed signal indicative of rated speed.

2. A control according to claim 1 further characterized by:
    pitch angle means for providing a pitch angle signal indicative of the pitch angle of the helicopter;
    roll angle means for providing a roll angle signal indicative of the roll angle of the helicopter; and
    said fuel controlling signal processing means comprising means responsive to said pitch angle signal indicating a helicopter pitch angle which is in excess of a pitch angle threshold magnitude or said roll angle signal indicating a helicopter roll angle which is in excess of a roll angle threshold magnitude for continuing to provide said predetermined reference speed signal after the lapse of said predetermined time, and responsive to the lapse of said predetermined time, said pitch angle signal indicating a helicopter pitch angle which is less than said pitch angle threshold magnitude, said roll angle signal indicating a helicopter roll angle which is less than said roll angle threshold magnitude and said vertical acceleration signal indicating a positive vertical acceleration which is less than said predetermined threshold magnitude for providing said successively greater decrements to said reference speed signal to reach a reference speed signal indicative of rated speed.

3. A control according to claim 1 further characterized by:
    quiet mode indicating means for providing a quiet mode signal indicative of the helicopter operating in quiet mode;
    means for providing a weight on wheel signal indicative of the helicopter resting on its wheels; and
    said fuel controlling signal processing means comprising means responsive to said quiet mode signal or said weight on wheels signal for preventing increases in said reference speed.

4. A control according to claim 1 further characterized by:
   weapons ready indicating means for providing a weapons ready signal indicative of helicopter weapons being ready to be fired;
   means for providing a battle signal in response to the activation of a battle switch; and
   said fuel controlling signal processing means comprising means responsive to said weapons ready signal indicating that said weapons are ready to be fired and said battle signal indicating that said battle switch is activated for increasing said reference speed signal to said predetermined reference speed signal.

5. A control for a helicopter engine having a free turbine for normally driving the helicopter rotors at a rated speed, comprising:
   means for providing an actual speed signal indicative of the rotary speed of the free turbine;
   fuel valve means for metering fuel to said engine at a rate determined by a fuel command signal applied thereto; and
   fuel controlling signal processing means connected for response to said actual speed signal, for providing a reference speed signal indicative of desired rotary speed of the free turbine which reference speed signal normally indicates said rated speed and which reference speed signal alternatively indicates a speed greater than said rated speed in response to high rotor load and high descent rate maneuvers, for providing, in response to said actual speed signal and said reference speed signal, a speed error signal indicative of the difference in turbine speed indicated by said actual speed signal and said reference speed signal, and for providing said fuel command signal to said fuel valve means indicative of a desired fuel flow rate as a function of said speed error signal;
   characterized by:
   a vertical accelerometer for providing a vertical acceleration signal indicative of acceleration of the helicopter in a direction substantially parallel to the rotary axis of the main rotor;
   vertical descent rate means for providing a vertical descent rate signal indicative of the vertical descent rate of the helicopter;
   pitch angle means for providing a pitch angle signal indicative of the pitch angle of the helicopter;
   roll angle means for providing a roll angle signal indicative of the roll angle of the helicopter; and
   said fuel controlling signal processing means comprising means responsive to said vertical acceleration signal indicating positive vertical acceleration in excess of a threshold magnitude, said threshold magnitude being a function of said vertical descent rate signal, for providing successively greater speed increasing increments to said reference speed signal to reach a predetermined reference speed signal indicating a reference speed in excess of rated speed, for providing said predetermined reference speed signal for at least a predetermined time, and responsive to the lapse of said predetermined time, said vertical acceleration signal indicating a positive vertical acceleration which is less than a predetermined threshold magnitude, said pitch angle signal indicating a helicopter pitch angle which is less than a pitch angle threshold magnitude and said roll angle signal indicating a helicopter roll angle which is less than a roll angle threshold magnitude for providing successively greater decrements to said reference speed signal to reach a reference speed signal indicative of rated speed.

6. A control according to claim 5 further characterized by:
   quiet mode indicating means for providing a quiet mode signal indicative of the helicopter operating in quiet mode;
   means for providing a weight on wheel signal indicative of the helicopter resting on its wheels; and
   said fuel controlling signal processing means comprising means responsive to said quiet mode signal or said weight on wheels signal for preventing increases in said reference speed.

7. A control according to claim 5 further characterized by:
   weapons ready indicating means for providing a weapons ready signal indicative of helicopter weapons being ready to be fired;
   means for providing a battle signal in response to the activation of a battle switch; and
   said fuel controlling signal processing means comprising means responsive to said weapons ready signal indicating that said weapons are ready to be fired and said battle signal indicating that said battle switch is activated for increasing said reference speed signal to said predetermined reference speed signal.

* * * * *